Reissued Apr. 7, 1925. Re. 16,040

UNITED STATES PATENT OFFICE.

JOHN YOUNG, OF CALDWELL, NEW JERSEY, AND ELMER G. CROAKMAN, OF BUFFALO, NEW YORK, ASSIGNORS TO NATIONAL ANILINE & CHEMICAL COMPANY, INC., OF NEW YORK, N. Y., A CORPORATION OF NEW YORK.

PRODUCTION OF DIARYLGUANIDINES.

No Drawing. Original No. 1,446,818, dated February 27, 1923, Serial No. 574,297, filed July 11, 1922. Application for reissue filed February 3, 1925. Serial No. 6,666.

*To all whom it may concern:*

Be it known that we, JOHN YOUNG, a subject of the King of Great Britain, residing at Caldwell, in the county of Essex, State of New Jersey, and ELMER G. CROAKMAN, a citizen of the United States, residing at Buffalo, county of Erie, State of New York, have invented certain new and useful Improvements in the Production of Diarylguanidines; and we do hereby declare the following to be a full, clear, and exact description of the invention, such as will enable others skilled in the art to which it appertains to make and use the same.

This invention relates to improvements in the production of di-substituted guanidines, and more particularly diarylguanidines, such as diphenylguanidine, ditolyguanidine, etc.

It has heretofore been proposed to make diphenylguanidine by the action of lead oxide upon a boiling alcoholic ammoniacal solution of thiocarbanilide, but the yields produced have been poor and the diphenylguanidine contaminated with large quantities of resinous or tarlike impurities difficult to remove.

The present invention is based upon the discovery that diarylguanidines, such as diphenylguanidine, can be produced in excellent yield and substantially free from tarlike impurities by treating alcoholic ammoniacal solutions of the diarylthioureas with finely comminuted lead oxide at temperatures maintained considerably below the boiling point of the solution, and by isolating the resulting diarylguanidine from the alcoholic solution by acidifying, filtering and precipitation of the diarylguanidine with caustic alkali.

The invention will be further illustrated by the following specific example, but it will be understood that the invention is not limited thereto.

In a jacketed kettle equipped with an agitator, 884 pounds of thiocarbanilide are dissolved in 452 gallons of denatured alcohol (90%), and 344 pounds of aqueous ammonia of 28.5% strength (equivalent to 99 pounds of 100% $NH_3$) is then added and the temperature is brought to 38–40 degrees C. To this solution there is gradually added 965 pounds of very finely divided litharge, the addition being so regulated that about one to one and a half hours are required in the addition, while the solution is vigorously agitated. In this reaction the lead compound acts as a desulphurizing agent. The temperature of the reaction mixture gradually rises to 45 degrees C. and is prevented from going above this point. When the litharge has all been added, the temperature of the charge is maintained at 45 degrees C. with agitation for about one hour, or until the reaction is complete.

When the reaction is complete, the mixture is filtered while maintaining a temperature of 45 degrees C., and the residue is washed, first with alcohol at 45 degrees C., and then with water. The alcoholic filtrate, which should be clear, is then acidified by the addition of hydrochloric acid of 20 degrees Baumé until it shows an acid reaction toward brilliant yellow test paper. The acidified and well stirred solution is then diluted with water until the amount added is twice the volume of the alcohol present before acidification. The dilute solution is stirred for about one and one-half to two hours and then filtered. The solution of diphenylguanidine is thus separated from acid insoluble impurities. The filtrate is then neutralized with caustic soda, with resulting precipitation of the diphenylguanidine, which is immediately filtered off, thoroughly washed with water, freed from excess water in a centrifugal machine, dried in a current of air at 60° to 80° C. and ground to a fine powder. The diphenylguanidine is thus obtained substantially free from resinous and tarlike impurities.

In the above example the amount of ammonia is about 50% in excess, and this amount has been found very satisfactory. A larger quantity of aqueous ammonia would dilute the alcohol and thereby decrease its solvent properties. The amount of alcohol used in the process, taken in conjunction with the aqueous ammonia added to it, should be such that at the end of the reaction all of the diphenylguanidine remains in solution. In general, the alcohol at the end of the reaction should be of about 80% strength or higher where the reaction is carried out at 45 degrees C. By maintaining the solution at that temperature during filtration from the lead sulphide, the diphenylguanidine is kept in solution. If the solution is allowed to cool, the diphenylguanidine is liable to crystallize out to a greater or less extent.

The temperature used in the process can be somewhat varied, but we have found that temperatures considerably below the boiling point of the solution are important in preventing the formation of objectionable by-products and in giving a high yield of the diphenylguanidine. For example, at a temperature of 60 degrees C., a yield of about 77% diphenylguanidine was obtained; at 52 degrees C., a yield of about 84%, and at 45 degrees C., a yield of about 88% or more. The process can be carried out at still lower temperatures, and we have found that even at atmospheric temperatures the reaction readily takes place, but increased amounts of alcohol are necessary at lower temperatures and the resulting solution is accordingly more dilute. For example, we have found that by first dissolving thiocarbanilide in alcohol by heating, then allowing the solution to cool and adding ammonium hydroxide and lead oxide, and by agitating the mixture, the reaction will take place at room temperature, although a longer period of time is required and a somewhat increased amount of lead oxide and ammonia, as well as alcohol, are desirable. The resulting alcoholic solution after filtration from the lead sulphide can be concentrated and the diphenylguanidine separated by acidification, filtration and subsequent precipitation by making the solution alkaline with sodium hydroxide solution, filtering the diphenylguanidine, washing and drying.

The carrying out of the process of the present invention at low temperatures has the further advantage of greatly reducing the loss of ammonia by volatilization, so that excessive losses are avoided.

For best results we have found it important to use lead oxide which is finely divided in character, for example, lead oxide which will pass through a 200-mesh screen. The amount of lead oxide mentioned in the above example is about 12% in excess of that required by theory. Larger amounts can be used, particularly if the reaction is carried out at room temperature.

The alcohol used in the process can be recovered by distillation and rectification and used over again in the process.

Other diarylguanidines besides diphenylguanidine can be produced in a similar way. For example, di-o-tolylguanidine, di-p-tolylguanidine, etc. Where the dairylthiourea is a mixed product, that is, containing two different aryl groups, the diarylguanidine will similarly be a mixed product, that is, a product containing different aryl groups.

A mixed ditolyl guanidine can be produced for example by using as the starting material in making the ditolyl thiourea, the mixture of toluidines produced by reduction of mixed nitro-toluenes. For example, the so-called "low para cuts" may be used which are obtained in conjunction with the manufacture of para-nitrotoluene and which are composed of a mixture consisting chiefly of ortho-nitrotoluene (about 85 to 95 %) and para-nitrotoluene (about 3 to 15%), together with small amounts of meta-nitrotoluene and possibly other nitro bodies. Upon reducing this mixture, there is produced a mixture of the corresponding toluidines which can be used in making the di-tolylureas and in making the ditolyl substituted guanidines in the manner above described.

We claim:

1. The method of producing diarylguanidines, which comprises subjecting an alcoholic, ammoniacal solution of a diarylthiourea to the action of lead oxide at a temperature below about 60 degrees C.

2. The method of producing diarylguanidines, which comprises subjecting an alcoholic, ammoniacal solution of a diarylthiourea to the action of lead oxide at a temperature below about 45 degrees C.

3. The method of producing diarylguanidines, which comprises subjecting an alcoholic, ammoniacal solution of a diarylthiourea to the action of lead oxide at a temperature of about 40 to 45 degrees C.

4. The method of producing diphenylguanidine, which comprises subjecting an alcoholic, ammoniacal solution of thiocarbanilide to the action of lead oxide at a temperature below about 60 degrees C.

5. The method of producing diphenylguanidine, which comprises subjecting an alcoholic, ammoniacal solution of thiocarbanilide to the action of lead oxide at a temperature below about 45 degrees C.

6. The method of producing diphenylguanidine, which comprises subjecting an alcoholic, ammoniacal solution of thiocarbanilide to the action of lead oxide at a temperature of about 40 to 45 degrees C.

7. The method of producing diphenylguanidine, which comprises gradually adding lead oxide to an alcoholic, ammoniacal solution of thiocarbanilide at a temperature of about 40 to 45 degrees C.

8. The method of producing diarylguanidines, which comprises subjecting an alcoholic, ammoniacal solution of a diarylthiourea to the action of a lead compound acting as a desulphurizing agent at a temperature below about 60 degrees C.

9. The method of producing diphenylguanidine, which comprises subjecting an alcoholic, ammoniacal solution of thiocarbanilide to the action of a lead compound acting as a desulphurizing agent at a temperature below about 60 degrees C.

In testimony whereof we affix our signatures

JOHN YOUNG.
ELMER G. CROAKMAN.